2,725,326

QUATERNARY AMMONIUM SACCHARINATES AND PROCESS FOR PREPARING THE SAME

William J. Shibe, Jr., Riverton, N. J., and Sylvan I. Cohen, Flushing, and Martin S. Frant, Ossining, N. Y., assignors to Gallowhur Chemical Corporation, New York, N. Y., a corporation of New York No Drawing. Application March 10, 1954, Serial No. 415,442

7 Claims. (Cl. 167—33)

This invention relates to new chemical compounds resulting from the reaction of a quaternary ammonium compound with 2,3-dihydro-3-oxobenzisosulfonazole or its sodium salt, as well as to procedure for preparing the same.

Several types of quaternary ammonium compounds are per se well-known and are employed as detergents, emulsifiers and wetting agents, some of such quaternary ammonium compounds having fungicidal, bacteriostatic or bactericidal power. These compounds are well-known and include, for example, alkyl dimethyl benzyl ammonium chloride (benzalkonium chloride), lauryl pyridinium chloride, alkyl dichlorobenzyl dimethyl ammonium chloride, dodecylbenzyl trimethyl ammonium chloride, a mixture of soya trimethyl and di-coconut dimethyl ammonium chlorides and para di-isobutyl phenoxy ethoxy ethyl dimethyl benzyl ammonium chloride, as well as other quaternary ammonium halides and salts characterized by a pentavalent nitrogen atom. The chemical nature and general formula of these quaternary ammonium compounds, as well as various examples thereof, have been set forth in the application of Shibe, Cohen and Frant Ser. No. 402,604, filed January 6, 1954.

It has now been discovered that, by reacting a quaternary ammonium compound with saccharine or sodium saccharinate, new and highly useful and valuable compounds in solid or liquid form can be produced, which are not only water-insoluble but which have properties markedly superior to the quaternary ammonium and saccharine compounds themselves. This is particularly surprising and unexpected due to the fact that while the reactants are readily water-soluble and exhibit high germicidal activity, the resulting products are water-insoluble and possess equal or superior biocidal properties.

The new quaternary ammonium saccharinates are prepared by reacting an aqueous solution of a selected quaternary ammonium halide with 2,3-dihydro-3-oxobenzisosulfonazole or its sodium salt in aqueous solution whereby water-insoluble waxy or oily compounds are obtained having new chemical, physical and biological properties. These new compounds are herein generically designated as "quaternary ammonium saccharinates," the compound 2,3-dihydro-3-oxobenzisosulfonazole being commonly known as "saccharine."

The invention is illustrated by the following examples without limiting it thereto:

Example I 36 grams of alkyl dimethyl benzyl ammonium chloride were dissolved in three times its weight of water and to this were added, with stirring, 24 grams of sodium saccharinate as a 20% aqueous solution. A flocculent white precipitate was immediately formed and was removed by filtration, yielding 71.4 grams of the wet reaction products. Vacuum-drying over sodium hydroxide yielded 55 grams (92% of theoretical) of the new compound alkyl dimethyl benzyl ammonium saccharinate. This compound is a white waxy solid melting at 72–76° C. and can be re-crystallized from aqueous ethanol. It is insoluble in water, partly soluble in ligroin and pine oil and soluble in acetone, ethanol, benzene, chloroform and carbon tetrachloride.

Example II

In the same maner as Example I, 24 grams of sodium saccharinate, as a 20% solution, were reacted with 40 grams of alkyl dichlorobenzyl dimethyl ammonium chloride, as a 25% solution, and yielded 64 grams of a wet, waxy solid, which, upon drying, resulted in 49.9 grams (78% of theoretical) of alkyl dichlorobenzyl dimethyl ammonium saccharinate. This compound was recrystalized from benzene. It had a melting point of 96–100° C. The dry material forms a white microcrystalline powder which is insoluble in water, partly soluble in benzene, carbon tetrachloride, ligroin, pine oil and butyl acetate and soluble in ethanol, chloroform and acetone.

Similar saccharinates could be obtained in analogous manner by reacting sodium saccharinate with para diisobutyl phenoxy ethoxy ethyl dimethyl benzyl ammonium chloride, lauryl pyridinium chloride and "Arquad S-2C," which is a mixture of soya trimethyl ammonium chloride and di-coconut dimethyl ammonium chloride. The new compound formed from sodium saccharinate and para-di-isobutyl phenoxy ethoxy ethyl dimethyl benzyl ammonium saccharinate was a water-insoluble oil.

It will be understood that the particular physical characteristics of the quaternary ammonium saccharinates depend to some extent upon the quaternary ammonium compound which is selected for reaction. Other quaternary ammonium saccharinates can, likewise, be prepared from quaternary ammonium compounds other than those specified above and, so far as we are aware, saccharinates of any of the usual or known quaternary ammonium compounds can be readily prepared.

The quaternary ammonium saccharinates produced in accordance with the invention can be formulated into solutions which are water-dispersible either by being dissolved in a water-soluble solvent such as acetone or alcohol with or without additional wetting agent or by being dissolved in emulsifiable oils, such as pine oil, and the solutions and emulsions thus resulting, and which may have a concentration of from 1–50% of one or a mixture of the new compounds, have been found to be useful as pesticides, germicides and fungicides and may be applied directly from solution of an organic solvent, such as those listed above in describing typical solubilities. The unusual ease with which these compounds can be formed may be very advantageously utilized in the method of application thereof; for example, 6 grams of alkyl dimethyl benzyl ammonium chloride were dissolved in 200 ml. of water and a second separate solution was made up containing approximately 5 grams of sodium saccharinate in 200 ml. of water. Cloth, such as cotton duck, was passed through the first solution, the excess solution squeezed out and the cloth then passed through the second solution. This results in the precipitation of alkyl dimethyl benzyl ammonium saccharinate in and on the fibers of the cloth, giving a bacteriostatic and fungistatic finish which is resistant to leaching by water.

Tests were conducted with alkyl dimethyl benzyl ammonium saccharinate which demonstrated the utility and value thereof as follows:

A. *Bactericidal Test.*—A sterile water suspension of *Aerobacter aerogenes* containing ten million cells per ml. is placed in contact with various dilutions of the chemical for one hour. Transfers are then made to sterile synthetic liquid media subcultures and incubated for 48 hours at 37.5° C. The absence of growth indicates that all cells have been killed. Negative tubes are re-inoculated to prove that the chemical has not been carried over into the subcultures to inhibit growth.

The maximum killing dilution is 1:750,000. This compound is about 3 times more effective than the quaternary ammonium compound from which it is derived; i. e., alkyl dimethyl benzyl ammonium chloride which exhibits an end-point at 1:275,000.

B. *Fungitoxicity test.*—Standard spore germination technique for determination of inhibitory (fungistatic) activity:

*Monilinia fructicola* $ED_{50}=8.8$ p. p. m.
*Stemphylium sarcinaeforme* $ED_{50}=7.5$ p. p.p m.
*Alternaria oleracea* $ED_{50}=5.8$ p. p. m.

C. *Mildew proofing test.*—At 0.84% deposition in the fabric, the samples remained completely free of the growth of *Chaetomium globosum* using the standard accelerated mildew resistance method even after 24 hours of continuous leaching.

D. *Fungitoxicity test.*—Marked inhibition of mycelial growth results when the chemical is mixed with nutrient agar, e. g., a 1–5,000 solution produced 42.4% inhibition of *Aspergillus niger*.

This compound is about 25% more effective than the quaternary ammonium compound from which it is derived.

It is, therefore, apparent that in accordance with the present invention new and valuable quaternary ammonium saccharinates can be readily prepared and that, in particular, 2,3-dihydro-3-oxobenzisosulfonazole or its sodium salt reacts readily with a quaternary ammonium compound, which responds generally to the general formula $R_4NX$. In this formula, X is usually a halogen, such as chlorine or bromine, N is a pentavalent nitrogen atom which is directly bonded to the hydrocarbon groups represented by $R_4$, the meaning of which will be clearly understood from the quaternary ammonium compounds given as examples above and in the aforesaid application Ser. No. 402,604, the pertinent portions of which are hereby made a part hereof.

The invention particularly comprises the preparation of water-insoluble solid or liquid quaternary ammonium saccharinates from water-soluble quaternary ammonium compounds and water-soluble sodium saccharinate and are especially characterized by new chemical, physical and biological properties which are markedly superior to those of the reactants from which the new compounds are obtained.

The invention is defined by the appended claims.

We claim:

1. Alkyl dimethyl benzyl ammonium saccharinate as a white waxy solid melting at 72–76° C. and insoluble in water.

2. Alkyl dichlorobenzyl dimethyl ammonium saccharinate as a white microcrystalline powder melting at 96–100° C. and insoluble in water.

3. Dodecylbenzyl trimethyl ammonium saccharinate.

4. Lauryl pyridinium saccharinate.

5. The saccharinate of a mixture at soya trimethyl and di-coconut dimethyl ammonium chlorides.

6. Water-insoluble quaternary ammonium saccharinates in each of which the pentavalent nitrogen atom has one linkage to the saccharinate radical and is linked by four covalent bonds to carbon atoms.

7. A method of inhibiting the growth of microorganisms which comprises treating them with a 1–50% concentration of at least one of the water-insoluble quaternary ammonium saccharinates of claim 6 in a diluent.

References Cited in the file of this patent

UNITED STATES PATENTS

| | | |
|---|---|---|
| 2,014,421 | Baird | Sept. 17, 1935 |
| 2,104,068 | Baird | Jan. 4, 1938 |
| 2,538,645 | Hamilton | Jan. 16, 1951 |

FOREIGN PATENTS

| | | |
|---|---|---|
| 12,181 | Great Britain | of 1902 |

OTHER REFERENCES

Manessier-Mameli, Gazz. Chim. Ital., vol. 65, p. 51 (1935).

Hamilton et al.: J. Am. Pharm. Assoc., vol. 39, pp. 378–82 (1950).